United States Patent

Pricer et al.

[11] Patent Number: 5,873,053
[45] Date of Patent: Feb. 16, 1999

[54] ON-CHIP THERMOMETRY FOR CONTROL OF CHIP OPERATING TEMPERATURE

[75] Inventors: Wilbur D. Pricer, Charlotte; Wendell P. Noble, Milton; John A. Fifield, Underhill; John E. Gersbach, Burlington, all of Vt.

[73] Assignee: International Business Machines Corporation, Armonk, N.Y.

[21] Appl. No.: 841,967

[22] Filed: Apr. 8, 1997

[51] Int. Cl.$^6$ .................................................. G01K 7/01
[52] U.S. Cl. ............................ 702/130; 323/907; 326/32; 327/85; 327/513; 330/289
[58] Field of Search ...................................... 364/557, 580, 364/148, 152, 130; 395/750.01, 750.02, 750.03, 750.04, 555, 556, 557, 559, 560; 323/807; 326/32; 327/83, 138, 262, 378, 513; 374/210; 330/289; 334/5; 340/501; 331/176; 257/712, 107, 434; 702/130

[56] References Cited

U.S. PATENT DOCUMENTS

| | | | |
|---|---|---|---|
| 4,123,698 | 10/1978 | Timko et al. | 323/1 |
| 4,201,947 | 5/1980 | Schade, Jr. | 330/253 |
| 4,325,018 | 4/1982 | Schade, Jr. | 323/313 |
| 4,475,103 | 10/1984 | Brokaw et al. | 340/501 |
| 4,885,477 | 12/1989 | Bird et al. | 307/296.8 |
| 4,970,497 | 11/1990 | Broadwater et al. | 340/598 |
| 5,063,342 | 11/1991 | Hughes et al. | 323/315 |
| 5,357,149 | 10/1994 | Kimura | 307/310 |
| 5,422,832 | 6/1995 | Moyal | 364/557 |
| 5,434,443 | 7/1995 | Kelly et al. | 257/467 |
| 5,563,760 | 10/1996 | Lowis et al. | 361/103 |
| 5,606,265 | 2/1997 | Sakata et al. | 326/34 |

FOREIGN PATENT DOCUMENTS

0683558A1  11/1995  European Pat. Off. ......... H02H 5/04

OTHER PUBLICATIONS

S.M. Sze, Physics of Semiconductor Devices, 1981, pp. 446–448.
Ronald R. Troutman, Subthreshold Design Considerations For Insulated Gate Field–Effect Transistors, IEEE Journal of Solid–State Circuits, vol.SC–9, No. 2, Apr. 1974, pp. 56–60.
R. R. Troutman, Subthreshold Designs Considerations For Insulated Gate Field–Effect Transistors, Digest of Technical Papers, 1973 IEEE International Solid–State Circuits Conference, pp. 108–109.
Badih El–Kareh & Richard J. Bombard, Introduction To VlSI Silicon Devices, 1986, pp. 455–463.

*Primary Examiner*—John Barlow
*Assistant Examiner*—Patrick Assouad
*Attorney, Agent, or Firm*—Whitham, Curtis & Whitham; Howard J. Walter, Esq.

[57] ABSTRACT

Temperatures on a chip, including particular regions of a chip are monitored by sensing changes in sub-threshold conduction of a field effect transistor (FET) integrated on the chip due to changes in charge carrier population distribution with temperature therein. Such changes in sub-threshold current with temperature are preferably detected using a current mirror and two FETs with different channel geometry and slightly different gate voltages such that the currents are equal at a specific design temperature. The slightly different gate voltages are conveniently provided by a low current voltage divider with or without on-chip voltage regulation in which resistor ratios can be accurately and repeatably obtained. Variations from that temperature thus yield large current differences and substantial signal swing which improve noise immunity. Hysteresis can be applied to the output (or amplified output) of the current mirror to obtain bistable thermostat-like action. Variant applications provide sensing at plural chip locations (e.g. for sensing temperature gradients and temperatures of autonomously operating portions of the chip) and a plurality of temperatures on the chip. Temperatures thus monitored control implementation of performance enhancing algorithms in regard to the chip.

21 Claims, 6 Drawing Sheets

ON-CHIP THERMOMETRY FOR CONTROL OF CHIP OPERATING TEMPERATURE

BACKGROUND OF THE INVENTION

1. Field of the Invention

The present invention generally relates to temperature monitoring and power saving arrangements for integrated circuit devices and, more particularly, to on-chip temperature sensors suitable for integration with other circuit elements in memories, processors and logic arrays.

2. Description of the Prior Art

It is well known that the electrical characteristics of virtually all types of circuit elements vary somewhat with temperature because they rely to some degree on the bulk properties of the material. Even relatively stable devices such as inductors and capacitors and even metal connections may change dimensions slightly with changes in temperature and thus exhibit some degree of temperature dependency.

Semiconductors, in particular, are subject to substantial changes in electrical characteristics with temperature. In integrated circuits, digital switching speed, off-current and current drive capability can change dramatically with temperature. Switching threshold is also temperature dependent and may affect circuit performance and function if operating margins are small. Further, the temperature of each transistor is subject to wide variation with recent switching history of the device since CMOS circuits ideally only dissipate heat during the switching transition interval. Some additional resistive heating will occur during the conductive state of CMOS field effect transistors (FETs) and in the off state, as well, if the "off-current", Ioff, is not well-limited to near zero. In general, in processors, memories, logic arrays and the like, power and, hence, temperature rise is proportional to clock frequency.

Temperature dependent changes in electrical characteristics of semiconductor devices derive from several physical effects. For example, the population distribution of charge carriers among energy levels is governed by Boltzmann statistics which ascribe an energy distribution width that is proportional to temperature (kT). The effect of changes in charge carrier population distribution is observed as changes of the current-voltage characteristic of forward biased diodes and transistors in which current is limited by carrier emission over an energy barrier (e.g. developed in an FET at gate voltages below the conduction threshold). This change of population distribution of charge carriers with temperature is a comparatively large effect in FETs biased in the sub-threshold region which increases current (e.g. in the nanoamp range) with increase of temperature.

Further, the mobility of conducting carriers is inversely proportional to the rate of scattering by thermally energized scattering centers. This is a relatively weak effect. Increased scattering tends to increase resistance of simple conduction paths with increased temperature and may aggravate the production of heat in FET transistors.

A still more subtle effect is the movement of the Fermi energy toward the center of the band gap with increasing temperature. This effect causes such parameters as the work function and the voltage switching threshold of FETs to change with temperature. A fourth effect comparable in magnitude to movement of the Fermi energy is the thermal generation of charge carriers in the depletion region of a semiconductor device, such as a reverse-biased diode. The leakage current of a reverse-biased diode is limited by the number of carriers which can reach the junction of the device from a point at which they are thermally generated within a depletion region which is large compared to the distance such charge carriers can travel before recombination.

It should be noted that these four effects are highly distinct from each other in the nature and magnitude of the effects produced and the circumstances under which they can occur. For example, changes in conduction due to changes in charge carrier population distribution (Boltzmann statistics) relative to a barrier produce current changes in the nanoamp range in sub-threshold biased FETs which increase with temperature while decreases in carrier mobility due to scattering tends to decrease current with increasing temperature and to produce current changes in the picoamp range. Similarly, while changes in the Férmi level and thermal carrier generation with temperature cause increases in current with increasing temperature, the changes in current for a given increment of temperature are even more subtle by at least one order of magnitude than those caused by scattering and thus far below changes in sub-threshold current in FETs with temperature.

While temperature may cause significant changes in electrical characteristics of semiconductor devices, high temperatures and thermal cycling can also cause degradation of the reliability of integrated circuits by mechanisms such as metal migration in conductors and unintended impurity diffusion in portions of transistor structures. Therefore, to limit temperature rise near the switching frequency design limits of the integrated circuit, some algorithms have been derived to distribute switching loads across a chip or between chips in accordance with temperature. Thus sensitive monitoring of temperature of semiconductor devices is required to implement such algorithms and support extended duration of high performance operation of the integrated circuits.

Thermocouples can be used to accurately determine the temperature of semiconductor devices. They are known to be rugged and reliable and, once calibrated, of high sensitivity and accuracy. However, thermocouples cannot be integrated into the semiconductor substrate and are usually mounted on the package structure. Additionally, thermocouples also require a second bi-metal contact in another location and at a constant temperature for comparison. This requirement is difficult to meet at best, and impractical or impossible in many applications of integrated circuits such as portable processors.

While thermocouples are, themselves, highly accurate and sensitive, thermocouples attached to integrated circuit packages are decoupled from the chip by the heat path through the package and the rate of heat transfer through the material interfaces therein (and the thermal transfer barriers presented thereby) as well as the thermal mass and specific heat of the package materials from the actual instantaneous temperature of the chip. Further, as chip functionality and integration density increases, local temperature variations on the chip become of increasing importance. Thermocouples cannot discriminate temperature differences across such short distances.

Thermal detectors integrated on chips are useful in many applications. For example, dynamic random access memories (DRAMs) capable of storing several megabits of data are now within the purview of commercial manufacturing techniques. Such memories must be periodically refreshed which consumes a significant portion of operating time and limits periods during which the memory can be accessed.

The required refresh rate of DRAMs depends directly on temperature. The refresh operation is, itself, a significant contributor to chip heat.

Present refresh schemes assume that each DRAM is operating at its maximum temperature which is an increasingly less well-founded assumption as the size of DRAMs is increased and increased numbers of DRAMs are employed since maximum temperature conditions are typically only reached at high ambient temperature and immediately after a period of heavy, high-speed, continuous use. Accordingly, if temperature can be accurately monitored, the period of accessibility of the memory can be increased and stand-by power consumption limited to only that which is actually necessary. It should be understood that a reduction of refresh rate not only limits stand-by power consumption directly, but reduced refresh rate also reduces heat generation, further reducing temperature and required refresh rate. This further reduces power consumption which is of substantial importance where battery power is relied upon, such as in portable computers. similarly, in processors, power consumption and heat generation is a function of operating temperature. It has been demonstrated that significant reductions in power consumption can be achieved by algorithms which reduce processor temperature. Again, power consumption is of particular importance in portable processors which rely on battery power and in which temperature excursions are more likely to be large since portable processors generally do not include cooling fans. Therefore, it can be appreciated that substantial improvements in power consumption, reliability and the like can be achieved and processor and memory performance maximized when operations are based on actual chip temperature rather than assumed worst case conditions or based on temperature sensors which are decoupled from instantaneous actual chip temperature.

While some efforts have been made to provide an on-chip temperature sensor, success in achieving the potential performance improvements noted above has been limited. As noted above, several temperature dependent effects on electrical characteristics of semiconductors are quite subtle and may be comparable to noise in high speed switching circuit chip environments. For example, leakage of reverse-biased diodes has been used as an on-chip temperature sensor. However, reverse-biased diode leakage currents are typically in the picoamp range and are easily masked by other leakage mechanisms or by noise. Additionally, diode leakage characteristics are not generally monitored as part of normal integrated circuit manufacturing processes and thus the introduction of other leakage mechanisms may go undetected during manufacture.

More specifically, reverse biased diode leakage is due to carriers which are thermally generated within the junction depletion layers or carriers which are generated within a diffusion length of the junction and subsequently diffuse to the junction without recombining. Those carriers reaching the high electric field of the depletion region, due to the applied reverse bias, are accelerated by the field and contribute to the observed current. Although these two leakage current components are distinguishable, the resultant leakage currents are very small, in the picoamp or sub-picoamp range, and the changes due to temperature are correspondingly very small.

Thermal carrier generation is thus a relatively weak effect compared to changes in sub-threshold current in FETs, yielding current changes in the picoamp and fractional picoamp ranges for temperature excursions of interest and extremely variable with very small variations in device geometry. Reduction of the contribution of thermal carrier generation in reverse-biased diode leakage (e.g. to reduce variability) requires the use of extremely pure silicon, a lightly doped graded junction and contacts remote from the junction; all of which increase process cost and complexity and are, to some degree, inconsistent with other requirements of high density integration. Further, reduction of the current component of diode leakage due to thermal carrier generation to levels at all comparable to those due to changes of charge carrier population distribution with temperature, for whatever reason, reduces current level changes to levels comparable to noise.

Further, the temperature sensor itself must have low power consumption, produce little heat itself (which would interfere with the accuracy of measurement). Neither should the sensor produce performance-compromising heat, especially in portions of the chip local to the sensor where temperature would presumably be of particular importance due to high switching speed. Such production of heat would also be counter-productive to overall savings in power consumption. Further, the sensor circuit should ideally produce a relatively large signal which is immune to noise.

For example, in U.S. Pat. No. 5,357,149 to Kimura, a differential pair of field effect transistors is integrated on a semiconductor chip with the transistors in a similar orientation, presumably for common-mode noise rejection. The ratio of width to length of the respective transistors differs from each other but a feedback circuit is provided to alter gate voltage in one of the transistors such that the current is maintained equal in both transistors. This circuit must be operated in a relatively high current regime above the threshold on an FET and produces a signal derived from changes in carrier mobility with temperature which, as discussed above, is a relatively weak effect.

SUMMARY OF THE INVENTION

It is therefore an object of the present invention to provide a temperature sensor which can be formed on a semiconductor integrated circuit chip and used with minimal, if any, special calibration.

It is another object of the invention to provide a method and apparatus for controlling operations of an integrated circuit chip such as a processor, memory or logic array in accordance with chip temperature to reduce power consumption by the chip and to regulate temperature of the chip and portions thereof.

It is a further object of the invention to provide a method and apparatus for minimizing the time required for refresh of a dynamic random access memory (DRAM) in order to minimize power consumption and heat dissipation and to maximize the time periods in which the DRAM is available for access.

It is yet another object of the invention to provide an electronic "thermostat" to invoke control at a specific temperature of a semiconductor substrate and which can be integrated therewith at high accuracy and manufacturing yield with little or no increase in semiconductor processing complexity.

It is yet another object of the invention to provide for on-chip temperature monitoring based on changes of charge carrier population distribution and emission over an energy barrier (Boltzmann statistics) in integrated circuits.

In order to accomplish these and other objects of the invention, an integrated circuit is provided including an on-chip temperature sensor including two field effect transistors capable of carrying equal currents at a specific temperature and with a difference of sub-threshold voltage applied to respective control electrodes thereof, a series resistance voltage divider having a large total resistance, and a comparator circuit means for sensing differences in sub-threshold current in the two transistors at other temperatures.

In accordance with another aspect of the invention, a method of sensing change of temperature on an integrated circuit chip is provided including the steps of applying a first sub-threshold voltage to a field effect transistor formed together with the integrated circuit chip, and monitoring changes in sub-threshold current in the field effect transistor due to changes, with temperature, in charge carrier population distribution relative to a barrier in the field effect transistor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
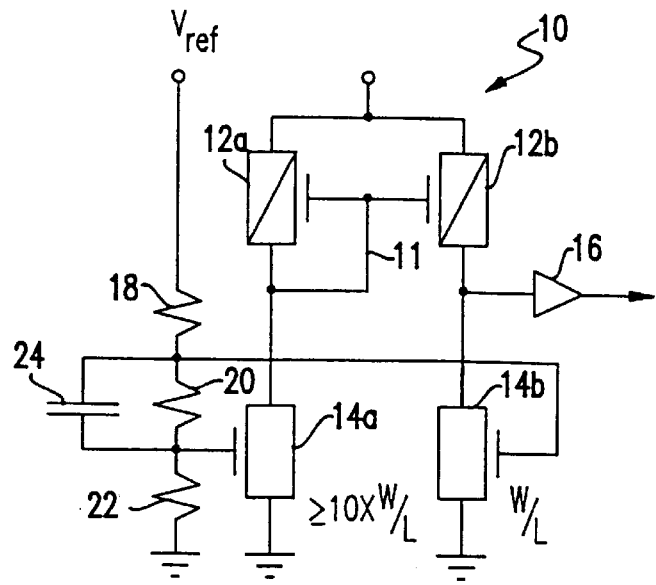
FIG. 1A is a schematic diagram of a basic form of the invention.

Referring now to the drawings, and more particularly to FIG. 1A, there is schematically shown a basic form 10 of the invention. It should be understood that the invention will be described in preferred forms using field effect transistors (FETS) since changes in FET sub-threshold conduction may be exploited for the sensor function. Sub-threshold conduction is generally in the nanoamp range (several orders of magnitude above that of reverse-biased diode leakage but still very small relative to the normal operating range of FETs. FET sub-threshold currents vary strongly with temperature and are of high importance to the proper functionality of both logic switching and memory structures. Therefore, sub-threshold current is closely monitored during manufacturing processes of such devices.

FET load transistors 12a, 12b are formed in respective parallel current paths forming a current mirror in series with a differential sensor FET pair 14a, 14b, each of which is biased into its sub-threshold conduction region. These transistors are preferably formed at an adequately large size that variability due to process variation will be negligible. It is preferred that the sensor transistors be designed with differing geometries such as having the channel width to length ratio differ by at least an order of magnitude between them. The circuit is designed so that the conduction currents of transistors 14a and 14b will be the same at the design temperature. To accomplish this in view of the differing transistor geometries there must be a small difference between the gate voltages applied to transistors 14a and 14b which is a small fraction of the power supply voltage. The effect of differing transistor geometries and gate voltages is to develop different characteristic rates of current change with temperature as depicted in FIG. 1C in which the slope of the LogI versus inverse temperature characteristic of Boltzmann statistic variation with temperature has a different slope for the respective transistors 14a and 14b.

It follows that the threshold temperature T at which the sub-threshold currents of transistors 14a and 14b are equal is a function of both transistor geometry and gate voltage and either or both can be varied to alter or adjust threshold temperature. The preferred difference of transistor width-to-length ratio is chosen to provide adequate sensitivity while keeping FET currents low and in the same sub-threshold conduction regime but either can be varied substantially (e.g. by 25% or more within the principles of the invention). As a practical matter, it is also preferred that the channel lengths of the transistors are the same to avoid certain process tolerances. Such design requirements can readily be met by those skilled in the art in view of the present disclosure.

The difference in transistor gate bias is preferably obtained through a series resistance precision voltage divider including resistors 18, 20 and 22 connected to a reference voltage. The power supply to the chip can usually be used if some provision is made for filtering of switching noise. This can be readily accomplished in most cases by making the total resistance of resistors 18, 20 and 22 relatively large to limit current in the voltage divider to the range of about 100 nanoamps $-1.0$ $\mu$a (which also limits resistive heating therein) and connecting a small capacitor 24 across differential bias resistor 20.

Typically, the required differential bias to equalize sub-threshold conduction at the design temperature is about 100 mv for a width differential between transistors 14a and 14b in a ratio of about 10:1 and thus, even for very low voltage power supplies (e.g. close to 1 volt) differential bias resistor 20 would be designed to present less than 10% of the total resistance of resistors 18, 20, 22 which is chosen to limit current to a low level, as noted above. The voltages thus developed by the voltage divider are not significantly affected by connections to gates of transistors 14a, 14b since the gates present only a small, wholly capacitive load. Bias resistor 22 would be a suitable fraction of the total to provide a reference bias voltage in the same sub-threshold conduction regime for both transistors 14a, 14b.

It should be recognized that while the embodiment of the invention illustrated in FIG. 1A (and FIG. 1B) relies on the precision of formation of transistors 12a, 12b, 14a, 14b and the voltage ratios developed by the resistive voltage divider, these parameters are among the most closely repeatable in integrated circuit fabrication. It will also be recalled that, as discussed above, the sensor transistors 14a and 14b are preferably formed at a size at which manufacturing variations will have negligible effect on sub-threshold conduction current. Further, regardless of size and actual resistance values of resistors 18, 20 and 22, process variations will be common to all of the resistors and the voltage ratios developed by the voltage divider will be maintained with high accuracy. It should also be recognized in this regard that while current in the voltage divider may vary from chip to chip, the total resistance of resistors 18, 20 and 22 (and their counterparts in other embodiments of the invention) is designed to be sufficiently high to limit current to a low level such that variations in total resistance will be insignificant in comparison to other power requirements regardless of variability of fabrication.

Thus designed to draw only small current through the voltage divider 18, 20, 22, a very small value capacitor 24 is generally adequate to filter switching noise reflected to the power supply for most applications such as an integrated circuit memory. In applications presenting an increased variable load on the power supply and/or where noise may be reflected in a voltage drop on the power connection to the chip (such as in a microprocessor), it is generally adequate to provide the reference voltage from the power supply to the voltage divider on a dedicated power supply pin since the small load presented by the voltage divider will be constant. Other on-chip power supply arrangements suitable to the practice of the invention, if higher accuracy is needed, will be discussed below in regard to FIGS. 3A and 3B.

It should also be understood that, as a voltage divider, only the ratio of resistors 18, 20 and 22 are important to the development of bias and differential gate voltage in the practice of the invention. While processes for development of highly precise resistances are well-understood by those skilled in the art and are preferably employed in the practice of the invention, it is preferred that the resistive voltage divider be implemented by ion implantation in a device well which will generally be available at a convenient location on the chip and provides for extremely accurate achievement of resistance ratios even though somewhat greater variation in resistance values may be produced. Therefore, the voltage difference applied to respective gates of transistors 14a and 14b to achieve equal currents therein at any specific temperature can be readily and easily achieved with high accuracy and repeatability. Since sub-threshold conduction is strongly affected by temperature, the respective currents in transistors 14a and 14b will differ significantly at temperatures slightly removed from the design temperature, yielding a sensor of high sensitivity.

To complement this sensitivity, the currents in FETs 14a and 14b are preferably compared using a current mirror of well-understood design comprising transistors 12a and 12b driving amplifier 16. Current mirror circuits are known to automatically adjust for nominal currents over a very wide range of currents including the sub-threshold range. In fact, the two matched transistors 12a and 12b of the current mirror circuit are more closely matched in conductivity in the sub-threshold range than in the normal conduction region. The current mirror circuit has the additional advantage of providing a large voltage swing for small differences in currents in sensor transistors 14a and 14b.

Figure 1B:
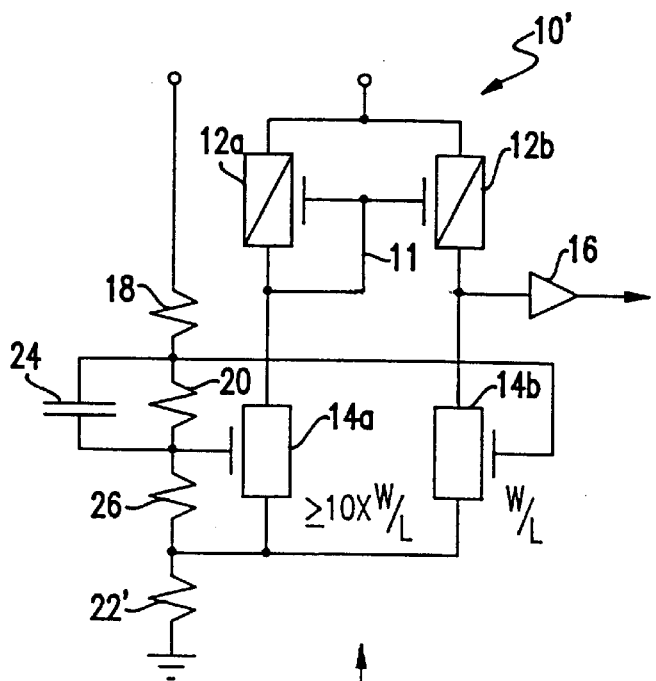
FIG. 1B is a schematic diagram of a variant form of the invention shown in FIG. 1A.
Figure 1C:
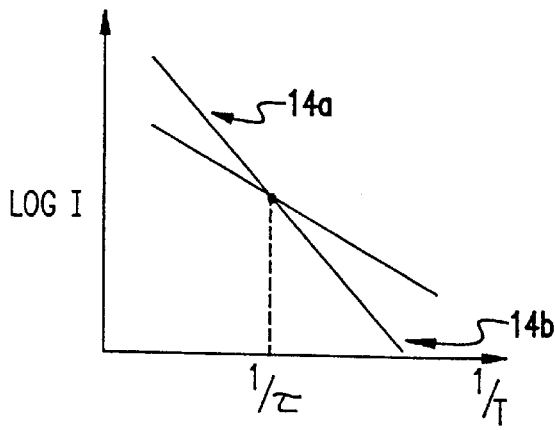
FIG. 1C is a graphical representation of the variation of sub-threshold current with temperature for the circuits of FIG. 1A or FIG. 1B.

Referring now to FIG. 1B, a preferred variation of the invention of FIG. 1A is shown. Corresponding reference numerals are used for corresponding elements of both Figures. Specifically, conduction through FETs 14a and 14b will depend primarily on the sub-threshold gate to source voltage. In the circuit of FIG. 1B, resistor 22' raises the source voltage of transistors 14a and 14b a few hundred millivolts above the substrate potential thereby substantially eliminating any back gate or semiconductor body effects to which the circuit of FIG. 1A may be subject.

Figure 2:
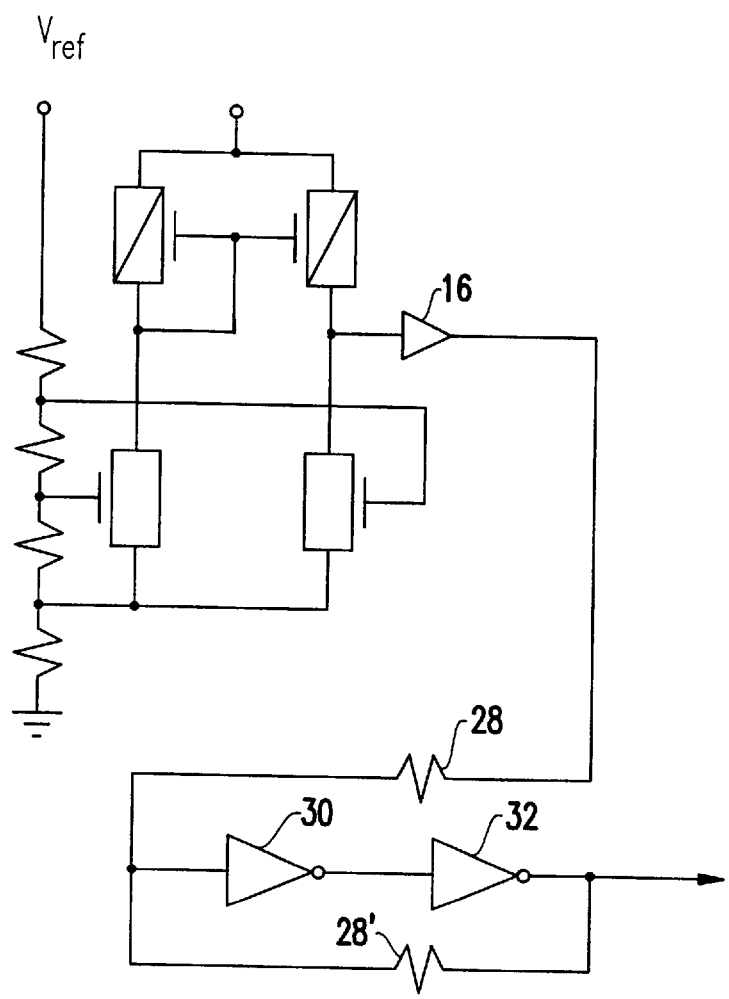
FIG. 2 is a schematic diagram of the exemplary form of this invention shown in FIG. 1B including a bistable output circuit in accordance with the invention.

Referring now to FIG. 2, the embodiment of FIG. 1B is shown in combination with further perfecting structure. While the output signal of amplifier 16 could be used directly as desired to exercise control over the functions of the chip, in this embodiment of the invention, the output of amplifier 16 is provided to a pair of inverters 30, 32 which, together with series resistor 28' provide a small amount of hysteresis in a manner well-understood in the art. Essentially, the feedback from inverter 32 to the input of inverter 30 provides bistability and thus guarantees a binary output.

In this way, a binary over-temperature/under-temperature output is always available and causes this embodiment of the invention to function as a thermostat providing a control function at any desired temperature. The ratio of resistors 28, 28' determines the amount of variation of output voltage from amplifier 16 will be required (e.g. hysteresis) before latching of the opposite output logic state will occur to stabilize operation.

Figure 3A:
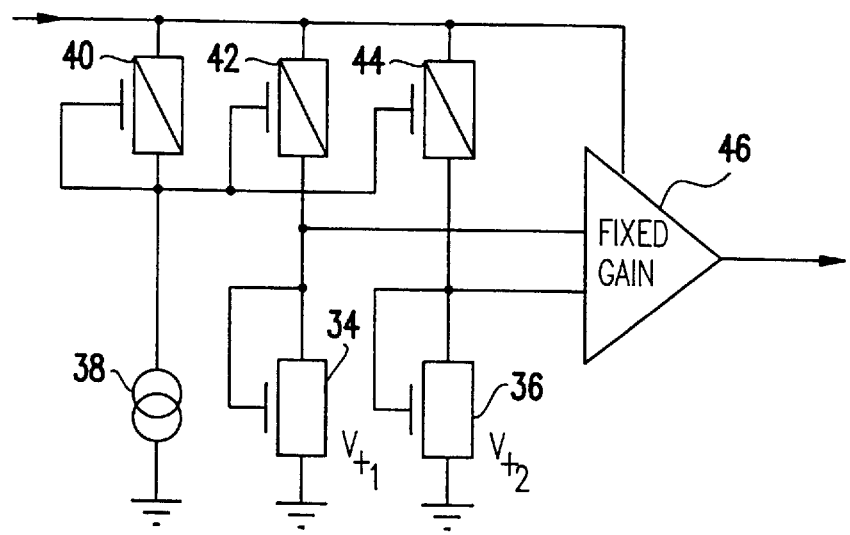
FIGS. 3A and 3B are schematic diagrams of on-chip power supplies which may be used in accordance with the invention.

Referring now to FIG. 3A, a voltage regulator suitable for on-chip integration and use with the invention is shown. Use of such a circuit is preferred where noise cannot be adequately filtered as discussed above by capacitor 24 and/or if an adequately constant voltage reference cannot be provided. In this circuit, a current source 38 is provided in series with transistor 40 which operates in conjunction with transistors 42 and 44 to form two current mirrors. Transistors 34 and 36 are formed have different thresholds by any known technique but preferably by different gate material work functions. Care should be taken in this regard through utilization of well-understood circuit design principles, that any variation of voltage so regulated does not vary with temperature in a manner which would cancel or reduce the temperature sensing function of the sensor transistors 14a, 14b as biased by the voltage divider.

The common gate drain nodes of these transistors are provided as differential inputs to a fixed gain amplifier 46 which thus provides a highly stable voltage output suitable for driving a voltage divider of either FIG. 1A or FIG. 1B. While inclusion of this circuit may avoid the need for filter capacitor 24, it is considered preferable to retain such a filtering arrangement, particularly for the embodiment of FIG. 2 so that a noise spike will not be able to cause switching of the bistable output circuit, particularly when output of the amplifier 16 is within the hysteresis value limits of the circuit.

Figure 3B:
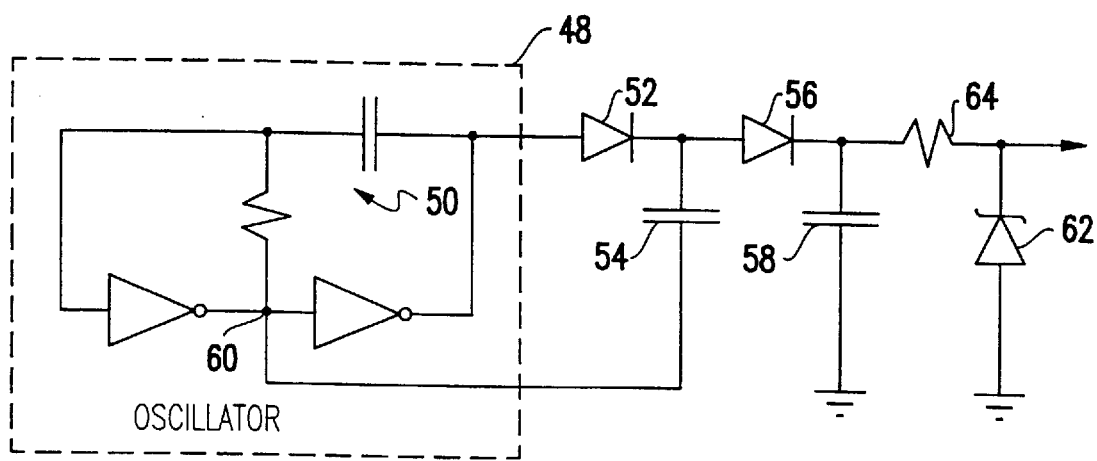

An alternative voltage regulator is shown in FIG. 3B for implementation where dual threshold transistors are not feasible or available. Essentially, this circuit comprises a simple oscillator circuit 48 comprised of a pair of inverters with a feedback resistor-capacitor network 50 causing the output of the circuit to oscillate. The oscillating output pumps charge into capacitor 54 through diode 52 when the oscillator output is high and node 60 of the oscillator is correspondingly low. In the opposite state of the oscillator, the voltage on capacitor 54 is referenced to a high voltage state of node 60 and charge will be pumped into capacitor 58 at approximately twice the voltage swing of the oscillator 48, thus forming a voltage doubler. Voltage can be further increased, if desired, by providing further voltage doubler stages in a well-understood manner. In either case, the increased voltage can then be adequately regulated by a Zener diode 62 and resistor 64.

Figure 4:
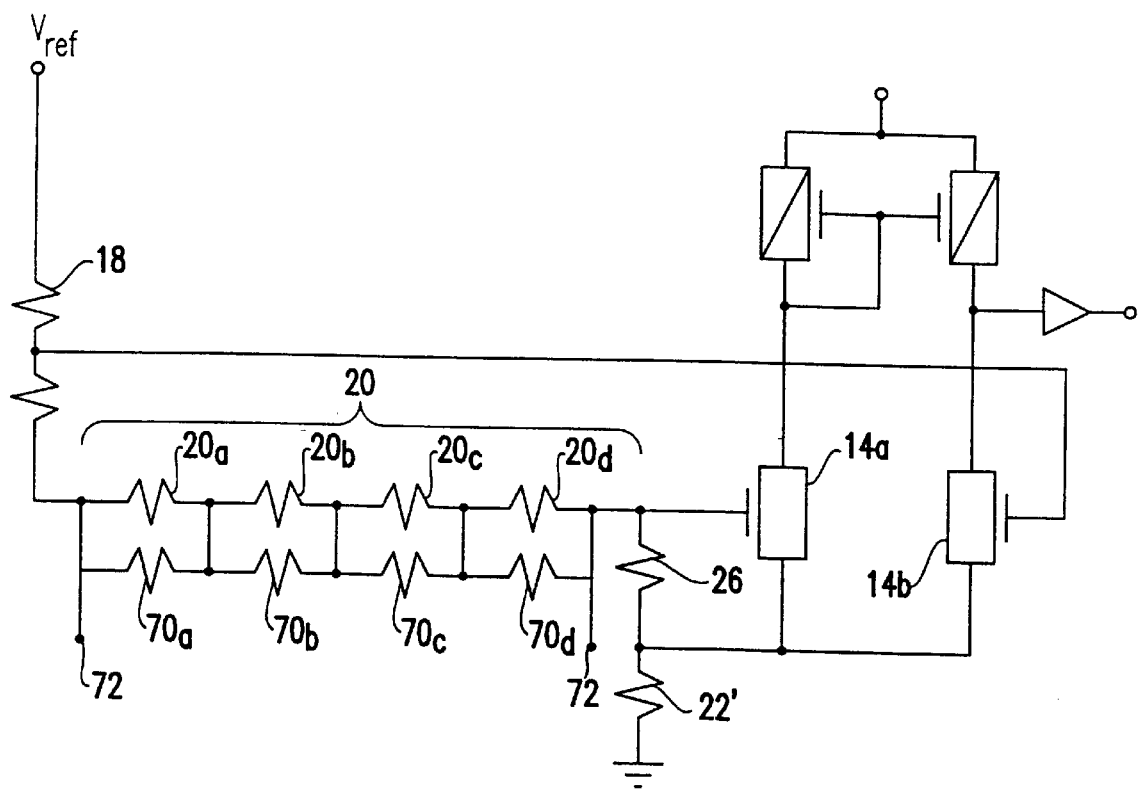
FIG. 4 is a schematic diagram of a preferred form of the invention using fuses for enabling accurate calibration.

Referring now to FIG. 4, a further perfecting feature of the invention will now be discussed. As noted above, sensor transistors 14a and 14b and the resistors in voltage divider 18, 20, 22' and 26 can generally be formed with sufficient accuracy to match currents in the sensor transistors as a matter of original design and fabrication. However, circumstances may arise in which some modification of the voltage divider may be desirable after fabrication. For example, a marginal voltage divider which might cause rejection of an entire processor or memory chip and thus reduce manufacturing yield could be repaired by formation of a further sub-divided resistor 20, portions of which are shunted by fuses. Likewise, a functional memory having slightly increased charge leakage at the design temperature but which would be fully functional if refreshed at rates corresponding to a lower threshold temperature could have the control temperature adjusted by a similar mechanism which can similarly be done by selection of resistors included in resistor 20. In summary, while accuracy of the voltage dividers of FIGS. 1A and 1B will usually be sufficient, increased accuracy and/or adjustment of the temperature to be sensed can be provided through use of the embodiment of FIG. 4.

More specifically, in the embodiment of FIG. 4, resistor 20 of the voltage divider of FIG. 1A or 1B is divided into a plurality of discrete resistors 20a, 20b, 20c, 20d, the number of which is not critical to the practice of the invention. It is preferred to form one of these resistors having a resistance value of about 90% to 75% or less of the design value of resistor 20 in FIG. 1A or 1B, and to provide additional resistors with shunt fuses in a weighted array (e.g. a 1r, 2r, 5r, . . . sequence of resistance values where r is the minimum desired resolution of resistance value adjustment to a total resistance of about 110% to 125% or more of the design value of resistor 20, depending on the range of adjustment of resistor value considered to be necessary.

Selected ones of fuses 70a, 70b, 70c and 70d shunting respective portions of resistor 20 can then be destroyed in sequence, with or without functional testing between fuse destructions, to develop the desired value of resistance 20 to cause sensor response at a desired temperature. It is preferred to perform fuse destruction with laser ablation. Numerous other suitable techniques such as bringing out individual terminals for selected nodes between fuses to allow selective electrical fuse destruction will be evident to those skilled in the art in view of this disclosure. It should also be understood that a similar arrangement for resistor trimming could be provided, if desired, for resistor 28' to adjust hysteresis value in the circuit of FIG. 2.

Figure 5:
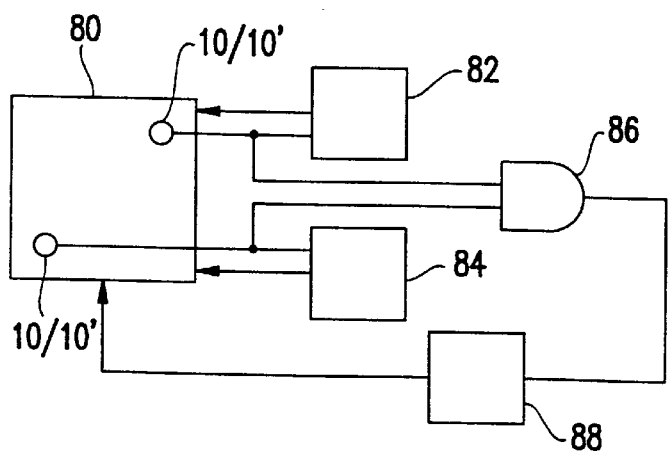
FIG. 5 is a schematic diagram of an exemplary control arrangement for control of a memory or a microprocessor in accordance with temperature utilizing the invention.

Referring now to FIG. 5, the use of one or more temperature sensor circuits as described above will be discussed. Specifically, in FIG. 5, a chip 80 including one, two or more of the sensor circuits described above such as 10 or 10' of FIGS. 1A and/or 1B, respectively (or that of FIG. 4), is schematically depicted. If more than one temperature sensor circuit is provided, it should be understood that they may be arranged to provide sensing at the same or different temperatures and their locations on the chip 80 may be as desired.

For example, if it is desired to provide different types of control at different chip temperatures, as will be discussed below in connection with FIG. 6, sensors 10/10' could be located close together and each having a resistor 20 of a distinct value and/or a transistor 14b of a distinct width-to-length ratio corresponding to a control switching threshold temperature referenced to one or more corresponding transistors 14a. On the other hand, the sensors could be located relatively remote from each other but central to a section of chip circuitry which may be more or less autonomously functional with regard to any other section of chip circuitry and separate or related control exercised thereover. As a further variant application of the invention, as will be discussed below in connection with FIG. 8, transistors of the sensor pair may be located more or less remotely from each other and formed with the same width-to-length ratio if the parameter of interest is the temperature gradient or the comparative temperature between them rather than comparison with a temperature threshold.

Figure 6:
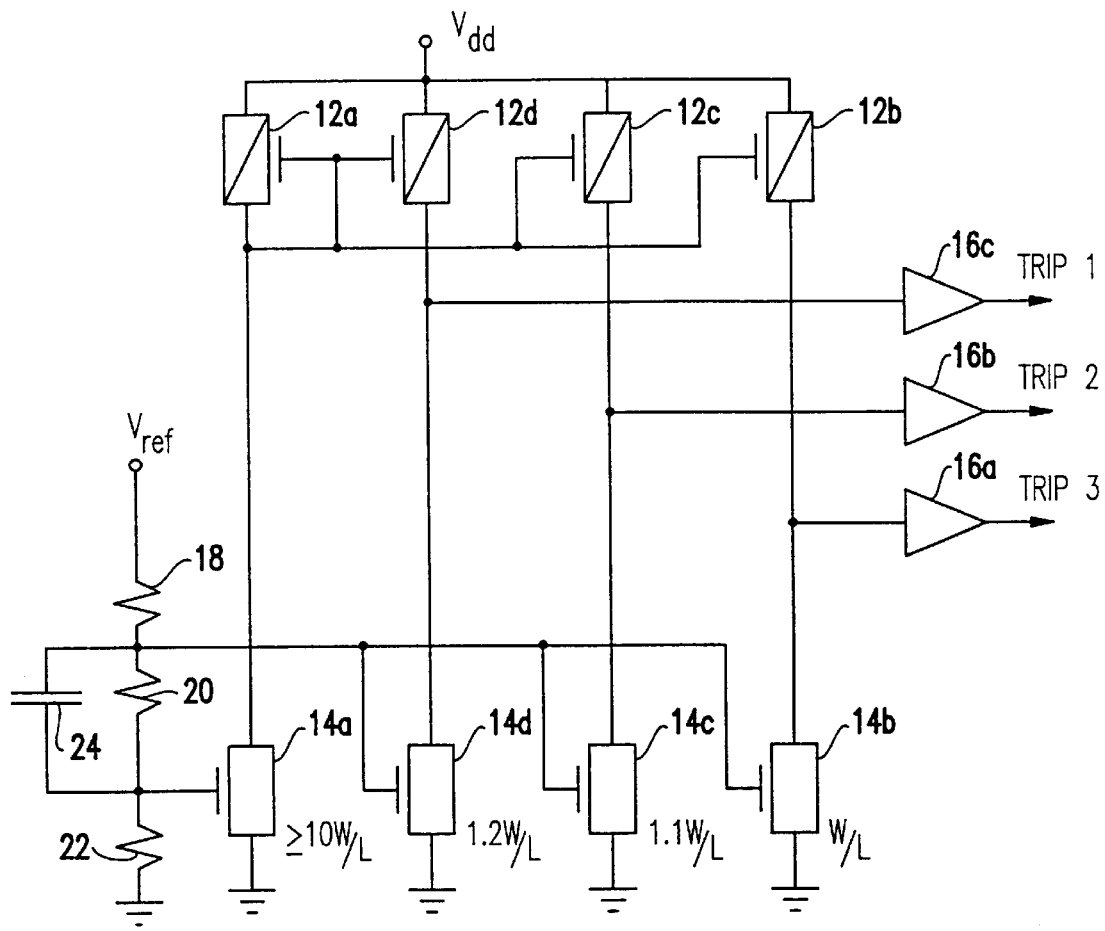
FIG. 6 is a schematic diagram of a variant form of the invention providing monitoring at a plurality of threshold temperatures.
Figure 7:
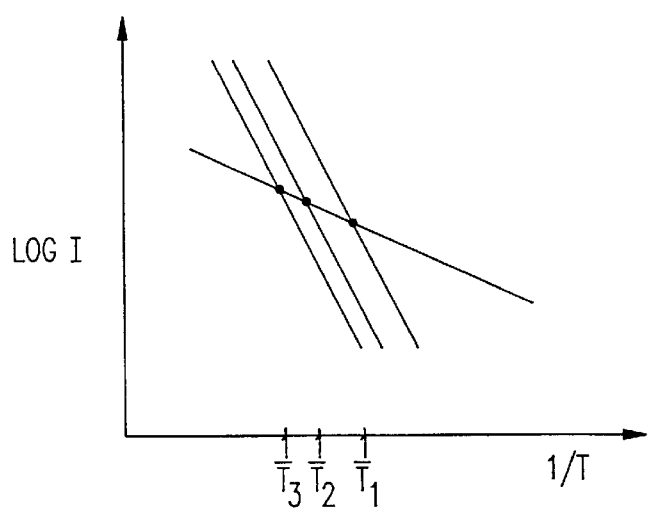
FIG. 7 is a graphical representation of the variation of sub-threshold current with temperature for the circuits of FIG. 6.

Referring now to FIG. 6, a variant form of the invention allowing monitoring at a plurality of temperatures is shown. For comparison, if only transistor 12a, 12b, 14a, 14b, voltage divider 18, 20, 22, filter 24 and amplifier 16a are considered, the circuit of FIG. 6 is identical to that of FIG. 1A. Similarly, the current versus temperature characteristics shown in FIG. 7 illustrate that three different temperatures are developed at which the current in transistor 14a will equal the current in each of transistors 14b, 14c and 14d, respectively, in the manner illustrated for 14b, alone, in FIG. 1C.

Accordingly, for applications where different portions of a chip are to be monitored at different threshold temperatures, additional separate reference transistors similar to 14a (and corresponding current mirror transistor 12a) could be provided at each location selected for each of transistors 14b, 14c and 14d. The size of the respective additional reference transistors can also be varied to maintain a constant or adjusted difference of width-to-length ratio in the same manner that the width-to-length ratios of transistors 14b, 14c and 14d are varied to provide different comparisons for different combinations of transistors/sensors.

On the other hand, as illustrated, a single reference transistor 14a and corresponding current mirror transistor 12a can be used for all temperatures, as shown, if only a single location on a chip is of interest or if the entire chip is to be monitored at a plurality of temperatures. It should be understood that the number of sensor transistors can be increased or decreased as needed for a particular application and that a plurality of the circuits of FIG. 6 could be included on the same chip as discussed above.

The same voltage divider (which can also be connected as discussed above in regard to FIG. 1B or formed and trimmed in the manner discussed above in regard to FIG. 4) can be used for all transistors and/or all such circuits, as is preferred for economy of chip space. Alternatively, different voltage dividers can be provided as may be convenient for some applications (e.g. if long or circuitous connections would be required). It should also be noted from FIG. 6 that the different temperatures to be monitored are achieved, as is preferred, by variation of sensor transistor geometry (and most preferably by variation of transistor width at a consistent length). However, at the expense of additional taps on the voltage divider (e.g. additional effective resistors) the same effect could be achieved by different voltages applied to transistors 14b, 14c and 14d or a combination of both variation of transistor geometry and voltage, as might be convenient, for example, to accommodate large differences between threshold temperatures. Of course, the hysteresis circuit of FIG. 2 and/or the power supply arrangements of FIGS. 3A or 3B are applicable to circuits designed in accordance with the principles of FIG. 6 or any portion thereof in the same manner discussed above in regard to FIG. 1A.

Figure 8:
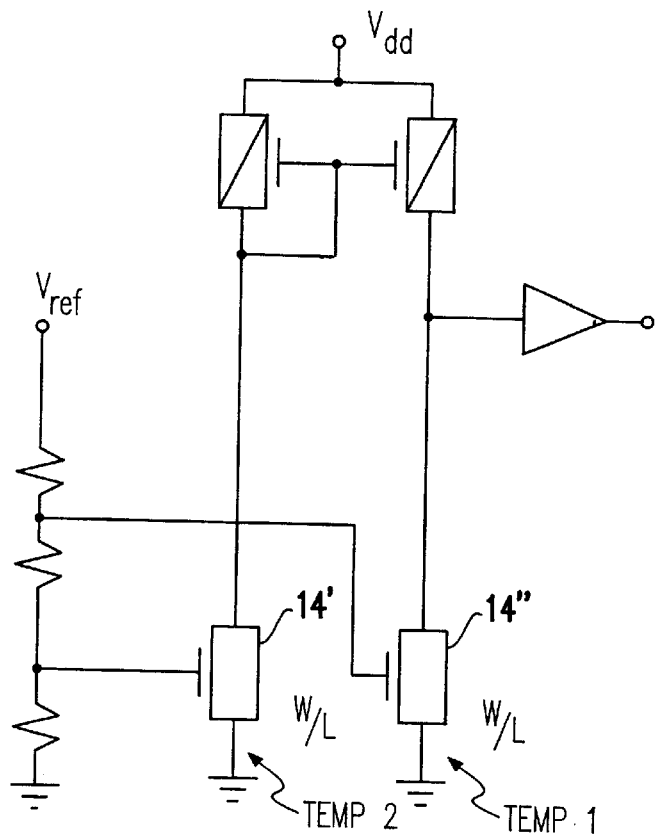
FIG. 8 is a schematic diagram of another variant form of the invention providing monitoring of a temperature gradient between two separated locations.

Referring now to FIG. 8, alluded to above, a variant embodiment of the invention providing monitoring of a temperature gradient between two locations is shown. In this case, the width-to-length ratios of the two transistors 14', 14" at separated locations are preferably the same but different gate voltages are applied. In theory, the gate voltages could be the same or slightly varied and the width-to-length ratio slightly varied, as well. However, in such a design, process variation of transistor geometry would likely be significant and achieving temperature accuracy would be difficult.

Figure 9:
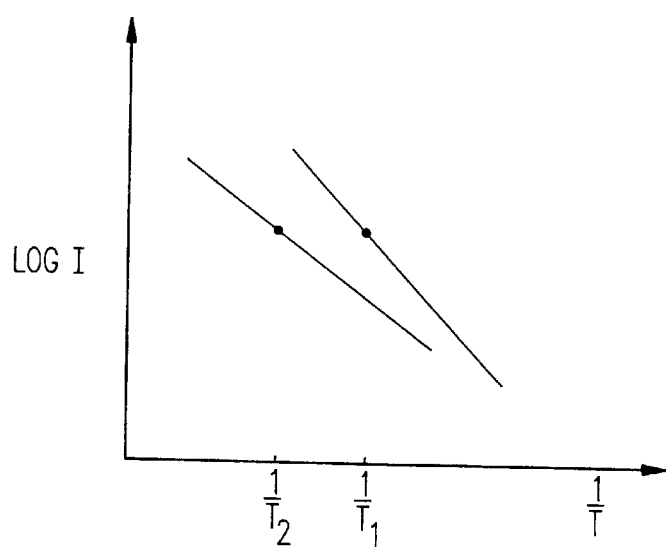
FIG. 9 is a graphical representation of the variation of sub-threshold current with temperature for the circuits of FIG. 8.

As shown in FIG. 9, the temperature at which the sub-threshold currents are equal establishes the temperature gradient between transistor locations (at a particular temperature of either transistor corresponding to that current). It should be noted that the differing slopes of the respective LogI characteristics due to the differing gate voltages allow different gradients to be monitored at different temperatures which will correspond to different sub-threshold currents. Conversely, the temperatures of two separated locations could be directly compared by supplying the same gate voltage to both transistors but at the expense of monitoring actual temperature unless another reference sensor transistor (of the same or different geometry) and having a different gate voltage applied thereto is provided. Other functionalities and applications for the invention will be evident to those skilled in the art from the functions provided in the various forms of the invention and variations thereof in various combinations.

Returning now to FIG. 5, however the sensors and sensor functions may be arranged, outputs of each sensor or combination of sensors are provided to respective controllers 82, 84 which implement particular operational algorithms for the chip. Logical combinations (e.g. 86) of sensor outputs may also control implementation of other algorithm(s) 88. These algorithms 82, 84, 88 may be simple functional elements such as timers or clocks which may directly control, for example, the initiation of refresh operation of a DRAM or a partition thereof, change the clock frequency of a processor or interrupt a clock signal to a chip or portion thereof and/or to alter a power supply voltage, as may be appropriate to the chip or power saving arrangements or algorithms. On the other hand, such controllers may be relatively complex algorithms which may, for example, provide for logic functions to be performed in one region of a logic array or processor to the exclusion of another while a particular region of the chip is over-temperature. As alluded to above, such algorithms have been demonstrated to allow power savings and improved chip performance as well as a degree of temperature regulation of the chip to maximize chip performance based on actual temperature or a temperature threshold rather than on a worst-case assumption. However, the details of such devices or algorithms are not otherwise important to the practice of the invention.

In view of the foregoing, it is evident that the invention provides a sensitive and accurate apparatus and methodology for sensing temperature or comparative temperature of a chip or a region thereof by exploiting the comparatively strong effect of variation of sub-threshold current in FETs with temperature-dependent changes in charge carrier population distribution (Boltzmann statistics). The sensor FETs can be integrated on a chip with little, if any, increase in process complexity. The physical effect by which sensing is accomplished is closely monitored in the ordinary processing during manufacture of integrated circuits and little, if any, additional cost is required to ensure accurate formation of the sensing circuit with other electronic elements on a chip. Inclusion of a bistable circuit provides a thermostat-like action for regulation of chip temperature or control of chip function or operational mode to maximize performance and/or minimize power consumption. Thus, for example, the invention supports maximizing the proportion of time a memory may be accessed as compared with refresh operations. Calibration of the temperature sensor circuit is not generally required but, if needed, adjustment of the sensed temperature can be adjusted to any desired value at an arbitrarily high accuracy.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. An integrated circuit including an on-chip temperature sensor including two field effect transistors capable of carrying equal currents at a specific temperature and with a difference of sub-threshold voltage applied to respective control electrodes thereof, and means for sensing differences in sub-threshold current in said two transistors at temperatures other than said specific temperature.

2. An integrated circuit as recited in claim 1, wherein one of said two field effect transistors has a first width-to-length ratio different from a second width-to-length ratio of another of said two field effect transistors.

3. An integrated circuit as recited in claim 2, wherein one of said first and second width-to-length ratios is approximately ten times another of said first and second width-to-length ratios.

4. An integrated circuit as recited in claim 1, further including means for raising the source potential of said at least two transistors above a substrate potential.

5. An integrated circuit as recited in claim 1, further including a third sensor field effect transistor.

6. An integrated circuit as recited in claim 5, wherein said third sensor field effect transistor has a third width-to-length ratio different from said first width-to-length ratio and said second width-to-length ratio.

7. An integrated circuit as recited in claim 5, further including means for applying a potential to a control electrode of said third sensor field effect transistor which is equal to a voltage applied to a control electrode of one of said first and second sensor field effect transistors.

8. An integrated circuit as recited in claim 1, further including a series resistance voltage divider having a large total resistance, a filter means connected to said voltage divider.

9. An integrated circuit as recited in claim 1, further including a regulated power supply for said voltage divider.

10. An integrated circuit as recited in claim 8, wherein said voltage divider comprises a plurality of resistors, at least one of said plurality of resistors having a fuse connected in parallel therewith.

11. An integrated circuit as recited in claim 1, wherein said means for sensing differences in current in said two transistors at temperatures other than said specific temperature includes a current mirror.

12. A method of sensing change of temperature on an integrated circuit chip including the steps of applying a first sub-threshold voltage to a field effect transistor formed together with said integrated circuit chip, and monitoring changes in sub-threshold current in said field effect transistor due to changes, with temperature, in charge carrier population distribution relative to a barrier in said field effect transistor.

13. A method as recited in claim 12, wherein said monitoring step includes comparing current in said field effect transistor with sub-threshold current in another field effect transistor having a different width-to-length ratio than said field effect transistor.

14. A method as recited in claim 13, including the further step of applying hysteresis to said comparing step.

15. A method as recited in claim 13, including the further step of applying a second voltage to said another field effect transistor.

16. A method as recited in claim 15, including the further step of trimming one of said first and second voltages.

17. A method as recited in claim 12, including the further step of filtering said first voltage.

18. A method as recited in claim 12, including the further step of controlling a refresh rate of a dynamic memory in accordance with said monitoring step.

19. A method as recited in claim 12, including the further step of controlling a clock frequency in accordance with said monitoring step.

20. A method as recited in claim 12, including the further step of suspending a clock signal in accordance with said monitoring step.

21. A method as recited in claim 12, including the further step of altering a power supply voltage in accordance with said monitoring step.

* * * * *

UNITED STATES PATENT AND TRADEMARK OFFICE
CERTIFICATE OF CORRECTION

PATENT NO. : 5,873,053
DATED : February 16, 1999
INVENTOR(S) : Wilbur D. Pricer et al.

It is certified that error appears in the above-identified patent and that said Letters Patent is hereby corrected as shown below:

column 3, line 20, delete "similarly" and replace with - - Similarly - -,

Signed and Sealed this

Fourth Day of January, 2000

Attest:

Attesting Officer

Acting Commissioner of Patents and Trademarks